US 7,932,341 B2

(12) United States Patent
Shimane et al.

(10) Patent No.: US 7,932,341 B2
(45) Date of Patent: Apr. 26, 2011

(54) POLYPROPYLENE POLYMER FILM AND ADHESIVE FILM USING THE SAME

(75) Inventors: Michihiro Shimane, Chikusei (JP); Osamu Yamamoto, Utsunomiya (JP); Yasushi Ooyama, Oyama (JP)

(73) Assignee: Hitachi Chemical Co., Ltd., Tokyo (JP)

(*) Notice: Subject to any disclaimer, the term of this patent is extended or adjusted under 35 U.S.C. 154(b) by 881 days.

(21) Appl. No.: 11/720,097

(22) PCT Filed: Nov. 24, 2005

(86) PCT No.: PCT/JP2005/021573
§ 371 (c)(1),
(2), (4) Date: May 24, 2007

(87) PCT Pub. No.: WO2006/057294
PCT Pub. Date: Jun. 1, 2006

(65) Prior Publication Data
US 2008/0020204 A1    Jan. 24, 2008

(30) Foreign Application Priority Data
Nov. 24, 2004  (JP) ................ P2004-338796

(51) Int. Cl.
*B32B 27/08* (2006.01)
*B32B 27/32* (2006.01)
*C08F 210/06* (2006.01)

(52) U.S. Cl. ............ 526/348.1; 526/348; 526/352; 428/500; 428/515; 428/516; 427/207.1; 427/208; 427/208.2; 427/208.4; 427/393.5

(58) Field of Classification Search .......... 526/348, 526/348.1, 352; 428/500, 515, 516; 427/207.1, 427/208, 208.2, 208.4, 393.5
See application file for complete search history.

(56) References Cited

U.S. PATENT DOCUMENTS

| | | | | |
|---|---|---|---|---|
| 6,096,814 | A * | 8/2000 | Tamura et al. | 524/232 |
| 6,562,886 | B1 * | 5/2003 | Minami et al. | 524/115 |
| 6,770,355 | B1 * | 8/2004 | Minami et al. | 428/220 |
| 7,250,211 | B1 | 7/2007 | Minami et al. | |

FOREIGN PATENT DOCUMENTS

| | | |
|---|---|---|
| EP | 0 927 743 | 7/1999 |
| JP | 06-073132 | 3/1994 |
| JP | 09-012657 | 1/1997 |
| JP | 10-036590 | 2/1998 |
| JP | 10-101866 | 4/1998 |
| JP | 10-237239 A | 9/1998 |
| JP | 10-259257 | 9/1998 |
| JP | 11-001584 | 1/1999 |
| JP | 2000-229345 A | 8/2000 |
| JP | 2001-122984 | 5/2001 |
| JP | 2001-145988 | 5/2001 |
| JP | 2001-323229 | 11/2001 |
| JP | 2003-249791 A | 9/2003 |
| KR | 1997-0070148 | 11/1997 |
| KR | 1999-0072412 | 9/1999 |
| TW | 527385 | 4/2003 |
| WO | WO 01/30890 A1 * | 3/2001 |

OTHER PUBLICATIONS

Taiwanese Official Action dated Feb. 24, 2009, for Application No. 094141306.
J. L. Koenig, et al., "Integrated Infrared Band Intensity Measurement of Stereoregularity in Polypropylene", *Journal of Applied Polymer Science*, vol. 9, pp. 359-367 (1965).
Korean Official Action dated Jun. 30, 2008, for Application No. 10-2007-7010053.
Korean Official Action dated Jul. 15, 2009, for Application No. 10-2007-7010053.
Taiwanese Official Action dated Aug. 11, 2009, for Application No. 0982048872001.
Official Action dated Jul. 13, 2010, Patent Application No. 2006-547821, 5 pages, Japan Patent Office, Japan.
Concise explanations of the relevance of KR 1997-0070148 and KR 1999-0072412, Sep. 28, 2010, 1 page.
Korean Official Action dated Jan. 19, 2009, for Application No. 10-2007-7010053.
Japanese Official Action dated Nov. 16, 2010; Patent Application No. 2006-547821; 5 pages; Japan Patent Office, Japan.

* cited by examiner

*Primary Examiner* — Roberto Rabago
(74) *Attorney, Agent, or Firm* — Antonelli, Terry, Stout & Kraus, LLP.

(57) ABSTRACT

An object of the present invention is to provide a polypropylene polymer film superior in convenience in handling that does not generate troubles such as wrinkling, elongation or breakage during processing at a high temperature of 80° C. to 120° C., independently of the conveying method used in the drying step, and an adhesive film having the polypropylene polymer film as its carrier. Provided are a polypropylene polymer film, characterized by having a tensile modulus of 300 MPa to 1,000 MPa under an atmosphere at 23° C. and 60 MPa to 120 MPa under an atmosphere at 120° C. and an adhesive film containing it as the carrier.

9 Claims, No Drawings

POLYPROPYLENE POLYMER FILM AND ADHESIVE FILM USING THE SAME

TECHNICAL FIELD

The present invention relates to a polypropylene polymer film superior in convenience in handling at normal temperature and also in rigidity in the high-temperature range and an adhesive film using the same as its carrier.

BACKGROUND ART

Because of superior chemical stability and mechanical properties, polypropylene polymer films have been used widely as packaging materials for protection of articles from dust and dirt for example during transportation and displaying, and are generally used as sealed when the article is desirably protected air-tightly. Recently, there is a need for acceleration of bag making and packaging for improvement of packaging efficiency, and thus, for example, Japanese Patent Application Laid-Open No. 6-73132 (Patent Document 1) proposed a polypropylene polymer film superior in the balance between low-temperature heat-sealing efficiency and rigidity. Alternatively, Japanese Patent Application Laid-Open No. 10-259257 (Patent Document 2) discloses a polypropylene polymer film improved in rigidity in the high temperature range and elongation in the low temperature range for improvement of the processability in cold districts. Yet alternatively, Japanese Patent Application Laid-Open No. 2001-323229 (Patent Document 3) discloses a polypropylene film having a particular creep compliance at 90° C.

SUMMARY OF THE INVENTION

The polypropylene polymer films described in Patent Document 1 and 2 were not favorable from the point of productivity, because, when such a polypropylene polymer film is coated with an adhesive and dried under heat at 80° C. to 120° C. for preparation of an adhesive film, the film is more easily wrinkled or broken by shrinkage or elongation. Even when there is no problem such as of wrinkling or breakage, the film loses its rigidity and is stretched when heated under a tension applied thereon, possibly causing a problem of increase in heat shrinkage in the drying step.

Methods of conveying the film in the drying step include a pin- or clip-tenter method of conveying a film while holding the two ends of the film, a roll-support method of holding the film on a conveyor roll, a belt conveyor method of holding the film on a belt, an air-floating method of conveying the film as it is floated by the balance in wind pressure caused by the hot air blown from the top and bottom nozzles, and the like. Among them, methods other than the air-floating method, which uses a device holding the film, may allow conveyance of the film without wrinkling, even when the film is less heat resistant and contracted or stretched to some extent. However, the air-floating method, in which the wind pressure is not well balanced unless the distance between the film and the nozzles from which the hot air is blown out is shortened, caused a problem of wrinkling and breakage of the film in contact with the nozzle, because the film is not conveyed smoothly by imbalance of the wind pressure caused by shrinkage or elongation of the film. Although operation and maintenance of the air-floating method is rather difficult, it has been used frequently in the drying step, because of the advantage that there is no scratching on the film.

In forming an adhesive layer on a less heat-resistant film, an adhesive layer previously formed on a liner (peel-away backing) by applying and drying an adhesive thereon may be transferred, and such a method may eliminate the problems such as wrinkling, but demands an additional transfer step using the liner (peel-away backing), which leads to problems of increased cost and deterioration in market competitiveness.

Patent Document 3 discloses a polypropylene-based film as the film overcoming such problems. However, the method may give a film not rigid enough to be used in the drying step at 90° C. or higher, for example in the drying step at a toluene-boiling point of 110° C. to 120° C., thus prohibiting use thereof in the drying step by the air-floating method and consequently, leaving the same problem.

Accordingly, an object of the present invention is to provide a polypropylene polymer film superior in convenience in handling that does not generate troubles such as wrinkling, elongation or breakage during processing at a high temperature of 80° C. to 120° C. independently of the conveying method used in the drying step, and an adhesive film having the polypropylene polymer film as its carrier.

Thus, the present invention has the following aspects <1> to <8>.

<1> A polypropylene polymer film, characterized by having a tensile modulus of 300 MPa to 1,000 MPa under an atmosphere at 23° C. and 60 MPa to 120 MPa under an atmosphere at 120° C.

<2> A polypropylene polymer film, characterized by having a crystallinity of 65% or more and 73% or less, as calculated according to the following Formula (1) by using the absorbance measured in an infrared spectrophotometer:

$$\text{crystallinity (\%)}=109\times(D_{998}-D_{917})/(D_{972}-D_{917}))-31.4 \quad (1)$$

(wherein, $D_{998}$, $D_{972}$ or $D_{917}$ represents the absorbance at 998 $cm^{-1}$, 972 $cm^{-1}$, or 917 $cm^{-1}$).

<3> The polypropylene polymer film according to <1>, wherein the crystallinity calculated according to the following Formula (1) by using the absorbance as measured in an infrared spectrophotometer is 65% or more and 73% or less:

$$\text{crystallinity (\%)}=109\times((D_{998}-D_{917})/(D_{972}-D_{917}))-31.4 \quad (1)$$

(wherein, $D_{998}$, $D_{972}$ or $D_{917}$ is the absorbance at 998 $cm^{-1}$, 972 $cm^{-1}$ or 917 $cm^{-1}$).

<4> The polypropylene polymer film according to any one of <1> to <3>, wherein the film is an undrawn film not processed in the drawing step during production.

<5> An adhesive film, characterized by having the polypropylene polymer film according to any one of <1> to <4> and an adhesive layer formed on one face or both faces of the polypropylene polymer film.

<6> A method of producing an adhesive film having the polypropylene polymer film according to any one of <1> to <4> as the carrier, characterized by including a step of coating an adhesive on one face or both faces of the carrier, and a step of drying the coated adhesive.

<7> The method of producing an adhesive film according to <6>, wherein the drying temperature in the step of drying the adhesive is 80 to 120° C.

<8> The method of producing an adhesive film according to <6> or <7>, characterized by further including a step of winding the dried polypropylene polymer film having the coated adhesive.

As described above, the present invention provides a polypropylene polymer film superior in convenience in handling that does not generate troubles such as wrinkling, elongation or breakage during processing at a high temperature of 80° C. to 120° C. independently of the conveying method used in the drying step, and an adhesive film having the polypropylene polymer film as its carrier.

This application claims priority from Japanese Patent Application No. 2004-338796 (application date: Nov. 24, 2004), the disclosures of which are incorporated by reference herein.

BEST MODE OF CARRYING OUT THE INVENTION

A propylene homopolymer, a propylene copolymer, or the mixture thereof is used as the raw material for the polypropylene polymer film according to the present invention. Another resin may be used in combination as well, in the range that does not impair the advantageous effects of the present invention.

The propylene copolymer is not particularly limited, and is favorably a copolymer selected from propylene-ethylene copolymers, propylene-$\alpha$-olefin copolymers and propylene-ethylene-$\alpha$-olefin copolymers, and both random and block copolymers thereof are used favorably. The propylene content in the propylene copolymer is preferably 80% or more, more preferably 90% or more.

Examples of the $\alpha$-olefins include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and the like. These $\alpha$-olefins may be used alone or in combination of two or more.

The polypropylene polymer film according to the present invention favorably used has a tensile modulus of 300 MPa to 1,000 MPa (preferably, more than 300 MPa and 1,000 MPa or less) under an atmosphere at 23° C. and a tensile modulus of 60 MPa to 120 MPa under an atmosphere at 120° C. More favorable is a polymer having a tensile modulus of 500 MPa to 1,000 MPa (preferably, more than 500 MPa and 1,000 MPa or less, particularly preferably 600 MPa or more and less than 900 MPa) under an atmosphere at 23° C. and a tensile modulus of 100 MPa to 120 MPa under an atmosphere at 120° C. A polymer having a tensile modulus of less than 300 MPa under an atmosphere at 23° C. often causes a problem of wrinkling by expansion when used under tension, while a polymer having a tensile modulus of more than 1,000 MPa under an atmosphere at 23° C. causes a problem of difficulty in bonding the resulting adhesive film because of excessive rigidity of the polymer. Alternatively, a polymer having a tensile modulus of less than 60 MPa under an atmosphere at 120° C. has an insufficient rigidity in the step of drying the adhesive during production of the adhesive film, causing a problem of wrinkling by shrinkage or elongation, while a polymer having a tensile modulus of more than 120 MPa under an atmosphere at 120° C. has a tensile modulus of more than 1,000 MPa under an atmosphere at 23° C. as described above, causing the problem of the difficulty in bonding due to excessive rigidity. The tensile modulus in the invention is determined according to JIS K 7113, and the tensile moduli of a polypropylene polymer film carrying no adhesive was determined in the machine direction (MD) and the traverse direction (TD), and the value smaller between the MD and TD tensile moduli was used as the tensile modulus of the film.

The polypropylene polymer film may be made more rigid by increasing the crystallinity of the film. The crystallinity of the polypropylene polymer film according to the present invention is preferably 65% or more and 73% or less, more preferably 67% or more and 71% or less. A polymer having a crystallinity of less than 65% is softer and does not have needed rigidity because of increase of its amorphous region, while a polymer having a crystallinity of more than 73% leads to excessive rigidity and difficulty in adhesion when the film is processed into an adhesive film. The crystallinity can be calculated according to the following Formula (1) from the absorbance determined in an infrared spectrophotometer (wherein, $D_{998}$, $D_{972}$, and $D_{917}$ respectively represent absorbances at 998 cm$^{-1}$, 972 cm$^{-1}$ and 917 cm$^{-1}$)

$$\text{Crystallinity (\%)} = 109 \times ((D_{998}-D_{917})/(D_{972}-D_{917})) - 31.4 \quad (1)$$

The polypropylene polymer film according to the present invention is preferably an undrawn film, because stretching during production of film gives a film higher in crystallinity by molecule orientation and control of the crystallinity is rather difficult. The term undrawn film means that the film is not processed in the drawing step, and accordingly, small stretching occurring in production steps such as that by winding tension (generally at 294 N/m or less) during film production is not included in the stretching.

The thickness of the polypropylene polymer film according to the present invention is preferably 5 to 200 $\mu$m, more preferably 8 to 100 $\mu$m. A thickness of 5 $\mu$m or lower leads to insufficient rigidity of the film and difficulty in handling. Alternatively, a thickness of more than 200 $\mu$m is unneeded, only leading to increase in the cost of the film.

The surface of the polypropylene polymer film according to the present invention may be subjected to surface treatment such as corona treatment or plasma treatment or to surface finishing such as application of an undercoat agent (primer) for improvement of adhesion force to the adhesive layer.

The polypropylene polymer film according to the present invention preferably has a melting point of 150° C. or higher, more preferably 160° C. or higher.

The polypropylene polymer film according to the present invention may be used as a single-layered film or a laminated film of several layers, and is thus not particularly limited.

Propylene polymer films are generally produced, for example, by extruding a raw material propylene polymer by a method such as melt extrusion by using a T die or inflation extrusion; and the propylene polymer film according to the present invention having a particular tensile modulus is prepared by properly adjusting the melting temperature, residual period, cooling speed after extruding, and others.

The polypropylene polymer film according to the present invention described above is particularly useful as a carrier (base film) of adhesive film.

The adhesive film according to the present invention is a film characterized by having an adhesive layer formed on one face or both faces of the polypropylene polymer film according to the present invention.

The adhesive for use in the adhesive layer is not particularly limited, and examples thereof include acrylic copolymers, rubbery polymers or copolymers of a diene monomer such as isoprene, isobutylene, or butadiene, silicone rubbers, natural rubbers and the like. An adhesive having a glass transition point of −20° C. or lower is preferable. The lower limit glass transition point of the adhesive is not particularly limited, but generally −80° C., from the point of productivity.

The acrylic copolymer is not particularly limited, but favorable examples thereof include copolymers of an alkyl acrylate or methacrylate ester monomer and a functional group-providing monomer. The alkyl acrylate or methacrylate ester monomer is not particularly limited, but favorable examples thereof include those containing an alkyl group having 1 to 8 carbon atoms such as ethyl acrylate, butyl acrylate, 2-hexyl acrylate, octyl acrylate, methyl methacrylate, ethyl methacrylate, and octyl methacrylate. A copolymerizable vinyl monomer, such as styrene, vinyl acetate, acrylonitrile, or methacrylonitrile, may be copolymerized in a suitable amount with the alkyl acrylate or methacrylate ester monomer.

Examples of the functional group-providing monomers include monomers having a functional group such as hydroxyl, carboxyl, amide, amino, or oxirane, and monomers reactive with the functional group of a crosslinking agent such as multifunctional isocyanate compound, melamine resin, and epoxy resin; and typical examples thereof include the followings.

(I) Hydroxyl Group-Containing Monomers

Acrylic or methacrylic acid hydroxyalkyl esters such as 2-hydroxyethyl acrylate, 2-hydroxybutyl acrylate, 2-hydroxypropylmethacrylate, 2-hydroxyethylmethacrylate, and the like.

(II) Carboxyl Group-Containing Monomers

Acrylic acid, methacrylic acid, maleic anhydride, itaconic acid, and the like.

(III) Amide Group-Containing Monomers

Acrylamide, methacrylamide diacetonoacrylamide, N-methylol acrylamide, N-methylolmethacrylamide, and the like.

(IV) Amino Group-Containing Monomers

Acrylic or methacrylic dialkylaminoalkyl esters such as dimethylaminoethyl acrylate and dimethylaminoethyl methacrylate.

(V) Oxirane Group-Containing Monomers

Glycidyl acrylate, glycidyl methacrylate, and the like.

In the acrylic copolymer, the alkyl acrylate or methacrylate ester monomer, the monomer copolymerizable therewith, and the functional group-providing monomer are preferably used in amounts respectively of 80 to 95 wt %, 0 to 20 wt % and 1 to 10 wt %, with respect to 100 wt % of the total monomers.

The weight-average molecular weight of the acrylic copolymer is preferably in the range of 100,000 to 1,000,000. A copolymer having a weight-average molecular weight of less than 100,000 contains a greater amount of low-molecular weight components, leading to contamination of the substrate surface as it is transferred thereon. Alternatively, a copolymer having a weight-average molecular weight of more than 1,000,000 is highly viscous when dissolved in solvent, making it difficult to give a smooth-surfaced adhesive layer when it is converted into an adhesive film. The weight-average molecular weight above is a value determined by gel-permeation chromatography using a calibration curve drawn with standard polystyrene samples.

Examples of the rubbery polymers or copolymers of diene monomers such as isoprene, isobutylene, and butadiene include isobutylene polymers (isobutylene polymers), butadiene copolymers, random copolymers of isobutylene and n-butylene, copolymers of isobutylene and isoprene (so-called, butyl rubbers, particularly called regular butyl rubbers), chlorinated butyl rubbers, brominated butyl rubbers, partially crosslinked butyl rubbers, resins modified with a functional group such as hydroxyl, carboxyl, amino, or epoxy group, and the like. A possible modification method is copolymerization with a functional group-providing monomer as described above, and in such a case, the functional group-providing monomer is preferably used in an amount of 1 to 10 wt % with respect to the total amount of the raw materials.

Alternatively, a crosslinking agent may be added to the adhesive. The crosslinking agent is not particularly limited, and examples thereof include multifunctional isocyanate compounds, melamine resins, epoxy resins, and the like. The functional group of such a crosslinking agent is selected from those reactive with the functional group of the adhesive.

The multifunctional isocyanate compound for use is not particularly limited and is, for example, a compound having two or more isocyanate groups in the molecule, and favorable examples thereof include tolylene diisocyanate, diphenylmethane diisocyanate, m-phenylene diisocyanate, biphenylene diisocyanate, tetramethylene diisocyanate, hexamethylene diisocyanate, hexamethylenediisocyanate, xylenediisocyanate, and the like. Alternatively, the dimer or trimer thereof may be used instead. Typical examples thereof include dihexamethylene diisocyanate adducts, trimethylhexamethylene diisocyanate adducts, and the like. In addition, adducts between a multifunctional isocyanate compound and a multifunctional alcohol compound such as ethylene glycol, propylene glycol, polyethylene glycol, polypropylene glycol, or glycerol may also be used.

The epoxy compound for the epoxy resin is not particularly limited and may be a compound having two or more epoxy groups in the molecule, and examples thereof include 1,6-hexanediol diglycidylether, neopentylglycol diglycidylether, acryl alcohol diglycidylether, resorcinol diglycidylether, diglycidyl adipate ester, diglycidyl phthalate ester, polyethylene glycol diglycidylethers having an addition mole number of 5 or less, trimethylolpropane tridiglycidylether, glycerol triglycidylether, pentaerythritol tetraglycidylether, and sorbitol tetraglycidylether; and commercially available epi-bis type and other epoxy resins.

The crosslinking agent is preferably used in such a manner that the amount of the functional group of crosslinking agent (reactive with the functional group of the adhesive) becomes in the range of 20 to 100% in equivalence with respect to the functional group of adhesive. An excessively smaller addition amount of the crosslinking agent results in decrease in the degree of crosslinking in the adhesive, deterioration in aggregation force of the adhesive, and transfer of the adhesive onto the bonding substrate surface, while an excessively greater addition amount in easier transfer of the crosslinking agent remaining unreacted in the adhesive onto the bonding substrate surface.

As described above, the rubbery polymer or the natural rubber above, which is used as an adhesive, is preferably not modified additionally with a functional group, and thus, there is basically no need for using the crosslinking agent in combination.

The thickness of the adhesive layer in the adhesive film according to the present invention is not particularly limited, but normally 1 to 30 μm.

The method of forming the adhesive layer is not particularly limited and may be any known method, and examples thereof include a method of dissolving an adhesive in water or an organic solvent, coating the solution after viscosity adjustment on one face or both faces of a carrier (polypropylene polymer film according to the present invention), and drying the coated film, and a method of dispersing or dissolving an adhesive and a crosslinking agent in water or an organic solvent, forming a layer containing the adhesive and others by coating the mixture after viscosity adjustment on one face or both faces of a carrier, and drying the coated layer while allowing reaction of the adhesive with the crosslinking agent. When one of the acrylic copolymers is used as the adhesive, an adhesive layer is preferably formed by dissolving the acrylic copolymer and a crosslinking agent in an organic solvent, coating the solution after viscosity adjustment on a carrier, and drying the film while allowing reaction between them.

The reaction between the adhesive and the crosslinking agent and also drying of the adhesive layer may be performed under heat, but the temperature then is preferably 80 to 120° C. The adhesive layer thus formed is preferably aged. The adhesive layer is sufficiently aged at around normal temperature, for example at 20 to 25° C., in about a week.

Methods of conveying the film in the drying step include a pin-tenter or clip-tenter method of conveying a film while holding the two ends of the film, a roll-support method of holding the film on a conveyor roll, a belt conveyor method of holding the film on a belt, an air-floating method of conveying the film as it is floated by the balance in wind pressure caused by the hot air blown from the top and bottom nozzles, and the like. The air-floating method is particularly preferable in the present invention.

In addition, the adhesive film according to the present invention is preferably stored as it is wound for example around a roll.

The rear face (face of polypropylene polymer film opposite to the adhesive-coated face) of the adhesive film according to the present invention may be treated with a rear-face processing agent for example for adjustment of the roll-winding efficiency, and an antistatic agent may be coated on the rear face of the adhesive film or between the rear face and the carrier for prevention of electrostatic-charge build up during winding of the adhesive film and exfoliation of the film from the bonded substrate.

Examples of the rear-face processing agents include silicone resins, fluoroplastics, polyvinylalcohol resins, alkyl group-containing resins, and the like, as well as the modified resins and mixtures thereof. Examples of the antistatic agents include various antistatic agents superior in transparency including various cationic antistatic agents having a cationic group such as a quaternary ammonium salt, pyridinium salt, or primary to tertiary amino group; anionic antistatic agents having an anionic group such as a sulfonate salt group, sulfate ester base, or phosphate ester base; amphoteric antistatic agents such as amino acid-based and amino acid sulfate ester-based agents; nonionic antistatic agents such as amino alcohol-, glycerol-, and polyethylene glycol-based agents; high-molecular-weight polymeric antistatic agents of these antistatic agents; and the like.

The application of the adhesive film according to the present invention is not particularly limited, but the adhesive film is suitable as a protecting film for optical parts such as polarization plate and diffusion film that demands rigidity and heat resistance from the adhesive film.

EXAMPLES

Hereinafter, the present invention will be described specifically with reference to Examples, but it should be understood that the present invention is not limited by these Examples.

Example 1

Preparation of Polypropylene Film

An ethylene-propylene block copolymer (ethylene content: 6 wt %, MFR (melt flow rate): 2.0 g/10 minute, density: 0.90 g/cm$^3$) used as the raw material for polypropylene polymer film was processed by a T-die extrusion method (melting temperature: 250° C., chill roll temperature after extruding: 60° C.), into an undrawn polypropylene polymer film having a thickness of 40 μm. Then, one face of the polypropylene polymer film thus obtained was corona-treated.

<Preparation of Adhesive Film>

64 wt parts of an acrylic adhesive (functional group: hydroxyl group, SK Dyne 1473H, manufactured by Soken Chemical & Engineering Co., Ltd.), 2 wt parts of an isocyanate crosslinking agent (Coronate L45E, manufactured by Nippon Polyurethane Industry Co., Ltd.), and 34 wt parts of toluene were blended, to give an adhesive solution having a concentration of 30 wt %. The adhesive solution was coated on the corona-treated face of the polypropylene polymer film obtained above to a thickness of 10 μm after drying by using a comma coater, and the resulting film was dried with hot air in a drying oven by air-floating method at 100° C. for 3 minutes, to give an adhesive film. The adhesive film thus obtained was then wound around a paper core at a tension of 98 N/m, to give an adhesive film roll.

Example 2

A polypropylene polymer film and an adhesive film were prepared in a similar manner to Example 1, except that a polypropylene resin (MFR: 7.0 g/10 minute, density: 0.90 g/cm$^3$) was used as the raw material for the polypropylene polymer film.

Example 3

A polypropylene polymer film and an adhesive film were prepared in a similar manner to Example 1, except that an ethylene-propylene block copolymer (ethylene content: 5 wt %, MFR: 2.6 g/10 minute, density: 0.90 g/cm$^3$) was used as the raw material for the polypropylene polymer film.

Comparative Example 1

A polypropylene polymer film and an adhesive film were prepared in a similar manner to Example 1, except that the polypropylene polymer film was quenched rapidly, while the chill roll temperature during film formation was changed to 40° C.

Comparative Example 2

An adhesive film was prepared in a similar manner to Example 1, except that a biaxially-oriented polypropylene polymer film having a silicone resin layer on one face (40RL-01, manufactured by Oji Paper Co., Ltd., thickness: 40 μm) was used as the polypropylene polymer film and the face thereof opposite to the silicone resin layer was corona-treated.

Properties of the polypropylene polymer films and the adhesive films obtained in Examples and Comparative Examples above were determined by the following methods. The results are summarized in Table 1.

(1) Tensile Modulus

The tensile modulus of the polypropylene polymer film (having no coated adhesive) in the machine direction (MD) and the traverse direction (TD) was determined according to JIS K 7113. In measurement, the film sample was left under an atmospheres at 23° C. and then at 120° C. respectively for 5 minutes for stabilization of the temperature before measurement in a tensile tester (RTC-1210, manufactured by Orientec Co., Ltd.) The lower value between the tensile moduli in the MD and TD directions was used as the modulus of the film.

(2) Crystallinity

The absorbance of the polypropylene polymer film was determined in an infrared spectrophotometer (FTIR-4200, manufactured by Shimadzu Corporation), and the crystallinity thereof was calculated according to the following Formula (1) from the absorbances at various wavelengths obtained from the results:

$$\text{Crystallinity (\%)} = 109 \times ((D_{998} - D_{917})/(D_{972} - D_{917})) - 31.4 \quad (1)$$

(wherein, $D_{998}$, $D_{972}$ or $D_{917}$ is the absorbance at 998 cm$^{-1}$, 972 cm$^{-1}$ or 917 cm$^{-1}$).

(3) Convenience in Handling

The convenience in handling the polypropylene polymer film, specifically wrinkling and elongation thereof, during production (in particular, in the drying step) was evaluated according to the following criteria:

◯: There are no troubles such as of wrinkling and elongation, or there is some film wrinkling that can be corrected by processing with a stretcher roll.

X: There is film wrinkling that cannot be corrected by processing with a stretcher roll.

XX: Film is elongated in the drying step.

TABLE 1

| Sample | Tensile modulus (MPa) Atmosphere at 23° C. | Tensile modulus (MPa) Atmosphere at 120° C. | Crystallinity (%) | Convenience in handling |
|---|---|---|---|---|
| Example 1 | 653 | 105 | 69.8 | ◯ |
| Example 2 | 800 | 100 | 67.4 | ◯ |
| Example 3 | 622 | 66 | 67.9 | ◯ |
| Comparative Example 1 | 320 | 42 | 59.9 | XX |
| Comparative Example 2 | 1661 | 282 | 75.5 | X |

The polypropylene polymer films of Examples 1 to 3 caused no troubles such as wrinkling in the step of drying the adhesive and also no troubles such as wrinkling and elongation during winding and conveyance of the adhesive film, and were thus superior in convenience in handling. In contrast, the polypropylene polymer film of the Comparative Example 1 was elongated in the step of drying the adhesive, resulting in wrinkling of the adhesive film during its conveyance. There was no troubles such as wrinkling and elongation in the step of drying the adhesive in Comparative Example 2, but there was wrinkling, which could not be corrected with a stretcher roll, caused by the level difference due to air bubbles penetrating into the space between the polypropylene polymer film and the adhesive layer.

What is claimed is:

1. A polypropylene polymer film, characterized by having a tensile modulus of 300 MPa to 1,000 MPa under an atmosphere at 23° C. and 60 MPa to 120 MPa under an atmosphere at 120° C., and characterized by having a crystallinity of 65% or more and 73% or less, as calculated according to the following Formula (1) by using the absorbance measured in an infrared spectrophotometer:

$$\text{Crystallinity (\%)} = 109 \times ((D_{998} - D_{917})/(D_{972} - D_{917})) - 31.4 \quad (1)$$

(wherein $D_{998}$, or $D_{972}$ $D_{917}$ represents the absorbance at 998 cm$^{-1}$, 972 cm$^{-1}$, or 917 cm$^{-1}$), and wherein the polypropylene polymer film is composed of propylene copolymer containing 80% or more of propylene.

2. The polypropylene polymer film according to claim 1, wherein the film is an undrawn film not processed in a drawing step during production.

3. An adhesive film, characterized by having the polypropylene polymer film according to claim 1 and an adhesive layer formed on one face or both faces of the polypropylene polymer film.

4. A method of producing an adhesive film having the polypropylene polymer film according to claim 1 as the carrier, characterized by including a step of coating an adhesive on one face or both faces of the carrier, and a step of drying the coated adhesive.

5. The method of producing an adhesive film according to claim 4, wherein the drying temperature in the step of drying the adhesive is 80 to 120° C.

6. The method of producing an adhesive film according to claim 4, characterized by further including a step of winding the dried polypropylene polymer film having the coated adhesive.

7. An adhesive film, characterized by having the polypropylene polymer film according to claim 2 and an adhesive layer formed on one face or both faces of the polypropylene polymer film.

8. A method of producing an adhesive film having the polypropylene polymer film according to claim 2 as the carrier, characterized by including a step of coating an adhesive on one face or both faces of the carrier, and a step of drying the coated adhesive.

9. The method of producing an adhesive film according to claim 8, characterized by further including a step of winding the dried polypropylene polymer film having the coated adhesive.

* * * * *